F. HAWLEY & J. L. LORENSEN.
BEET ELEVATOR.
APPLICATION FILED DEC. 13, 1913.

1,199,696.

Patented Sept. 26, 1916.
2 SHEETS—SHEET 1.

Witnesses

Inventors
Frank Hawley,
J. L. Lorensen
By Victor J. Evans
Attorney

F. HAWLEY & J. L. LORENSEN.
BEET ELEVATOR.
APPLICATION FILED DEC. 13, 1913.
1,199,696.
Patented Sept. 26, 1916.
2 SHEETS—SHEET 2.
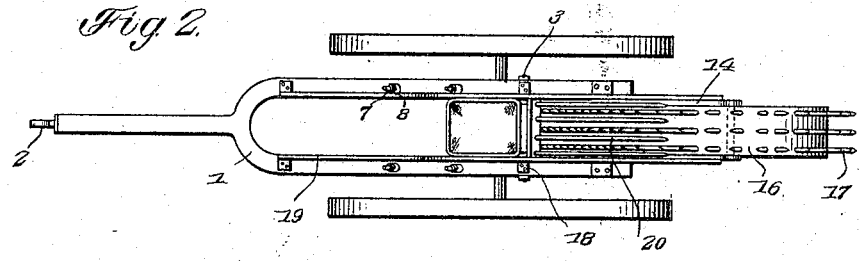
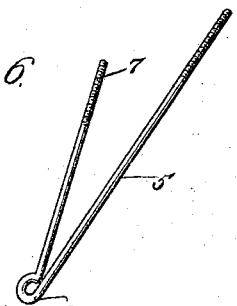
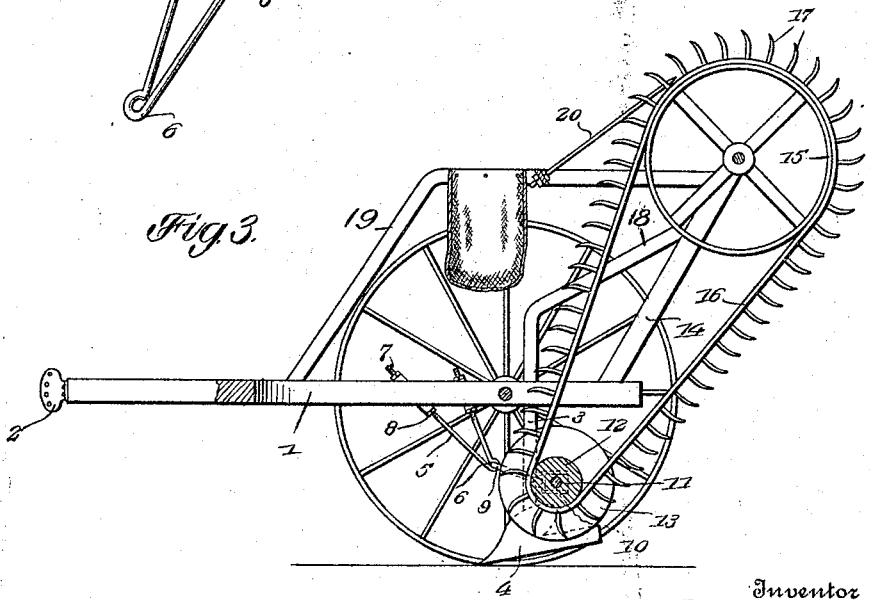
Witnesses
J. H. Crawford
W. Peacock
Inventor
Frank Hawley,
J. L. Lorensen
By Victor J. Evans
Attorney

UNITED STATES PATENT OFFICE.

FRANK HAWLEY AND JESSE LEON LORENSEN, OF MONROE, UTAH.

BEET-ELEVATOR.

1,199,696.  Specification of Letters Patent.  Patented Sept. 26, 1916.

Application filed December 3, 1913. Serial No. 806,563.

*To all whom it may concern:*

Be it known that we, FRANK HAWLEY and JESSE LEON LORENSEN, citizens of the United States, residing at Monroe, in the county of Sevier and State of Utah, have invented new and useful Improvements in Beet-Elevators, of which the following is a specification.

This invention relates to beet elevators adapted to be applied to diggers and it consists in the novel features hereinafter described and claimed.

An object of the invention is to provide an elevator of simple structure which is adapted to be applied to the frame of a beet digger and which operates to automatically raise the beets above the surface of the soil as the digger lifts the beets from the soil. After the beets have been elevated as above indicated they may be accumulated in bags or other receptacles or may be permitted to fall upon the surface of the soil as desired.

Figure 1:
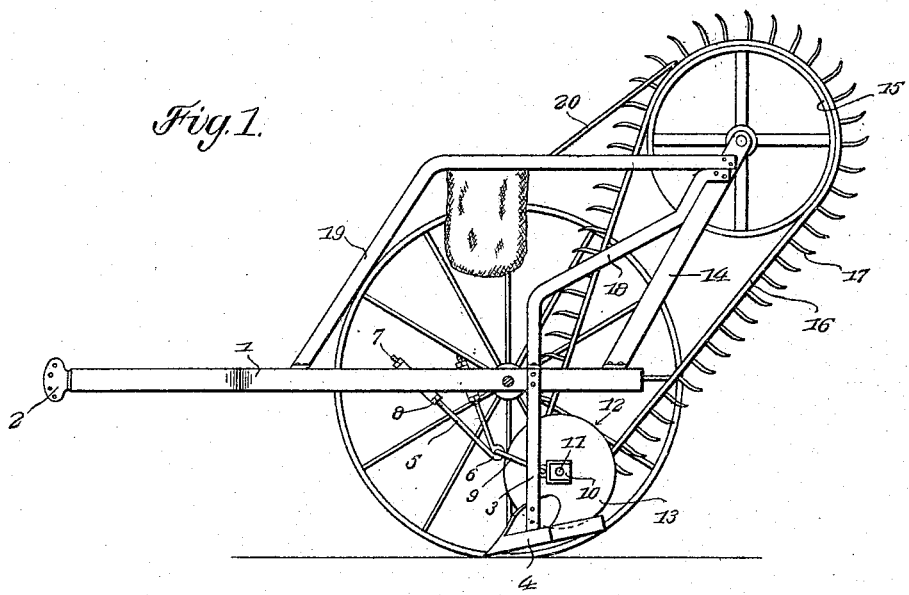
Figure 4:
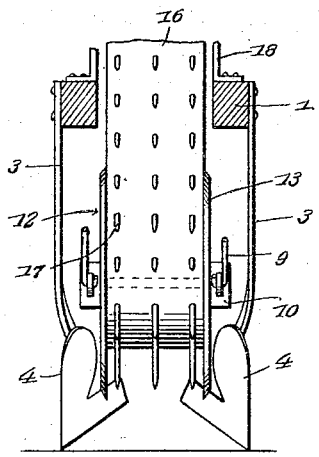
Figure 5:
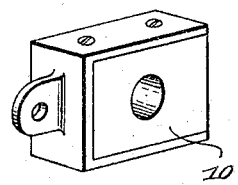

In the accompanying drawings:—Figure 1 is a side elevation of a digger with the elevator applied. Fig. 2 is a top plan view of the same. Fig. 3 is a vertical longitudinal sectional view of the same. Fig. 4 is a transverse sectional view of a portion of the same. Fig. 5 is a perspective view of a block used on the same. Fig. 6 is a side view of a bracket used on the same. Fig. 7 is a perspective view of a link used on the same.

As illustrated in the accompanying drawing the digger comprises a frame 1 to the forward end of which is attached a clevis 2. Standards 3 depend from the rear side portion of the frame 1 and carry at their lower ends digging shares 4 of any desired form or pattern.

Brackets 5 depend from the forward side portions of the frame 1 and may be adjusted vertically with relation to the said frame. These brackets are preferably made in the form of rods having end portions disposed at acute angles with relation to each other and provided at their intermediate portions with eyes 6. The end portions of the said rods are threaded as at 7 and nuts 8 are screwed upon the said thread. The threaded portions 7 of the said rods pass through the frame 1 and the nuts 8 bear against the opposite sides of the frame and serve as means for adjusting the brackets in the frame.

Links 9 are pivotally engaged in the eyes 6 and also pivotally engage blocks 10 which carry a shaft 11. A roller 12 is journaled upon the shaft 11 and is provided at its opposite sides with peripheral flanges 13.

Upwardly and rearwardly inclined standards 14 are mounted upon the rear portions of the side parts of the frame 1 and a roller 15 is journaled for rotation between the upper ends of the said standards 14. A flexible belt 16 is trained around the rollers 15 and 12 and the flanges 13 serve to hold the said belt in position against the periphery of the roller 12. Needles 17 are carried by the belt 16 and are arranged in rows disposed longitudinally of the said belt. The said needles are curved longitudinally so that their free end portions when they are below the roller 12 are rearwardly and downwardly inclined. Braces 18 are connected at their upper ends with the upper portions of the standards 14 and at their lower ends the said braces are connected with the intermediate portions of the side parts of the frame 1. Braces 19 are also connected at their rear ends with the upper portions of the standards 14 and the forward portions of the said braces 18 are connected with the sides of the frame 1 in the vicinity of the forward end thereof. Fingers 20 are supported by the braces 19 and are upwardly and rearwardly inclined the rear portion of the said fingers projecting into the spaces between the rows of needles 17 above the center of the roller 15. The fingers 20 are tangentially disposed with relation to the roller 15.

In operation as the digger is passed along a row of beets in the ground the shares 11 pass under the beets and lift the same. At the same time the flanges 13 cut into the surface of the soil and sever the outwardly disposed portions of the foliage of the beets from the bodies of the beets and the said flanges also cut any vines which may be disposed in the line of the row of beets. The roller 12 is held against the surface of the soil by its weight and may move vertically over uneven places at the surface of the soil inasmuch as the said roller is connected with the brackets 5 by means of the links 9. As the roller 12 passes over the beets it turns and the belt 16 travels in an orbit around the rollers 12 and 15. Consequently the needles 17 as they pass under the roller 12 stick into the beets and as the shares 9 continue to lift the beets the said needles carry the beets up along the rear runs of the belt 16 and over the upper portion of the roller 15. As soon as the beets are brought into contact with the fingers 20 the said fingers force the beets from the needle and the beets slide down the said fingers and may deposit in a bag carried upon the frame 1 at the forward ends of the needles or the beets may fall from the fingers to the surface of the ground.

By providing means for adjusting the brackets 5 with relation to the frame 1 the brackets may be so positioned as to permit the shafts 11 to operate at a relatively deep or shallow level below the surface of the soil.

From the above description it will be seen that the flanges 13 carried by the roller 12 perform a double function. The said flanges serve to hold the belt on the roller and at the same time they serve as vine cutters and as means for causing the roller 12 to rotate as the digger is passed along the row of beets.

What is claimed is:—

A beet harvester comprising a wheel mounted frame, brackets attached to the frame, links pivoted to the brackets, blocks pivoted to the links, a roller journaled in the blocks, a roller journaled in the upper portion of the frame, a belt trained around the roller and needles mounted on the belt.

In testimony whereof we have signed our names in presence of two witnesses.

FRANK HAWLEY.
JESSE LEON LORENSEN.

Witnesses:
DELBIRTH LORENSEN,
HANS LORENSEN.

Copies of this patent may be obtained for five cents each, by addressing the "Commissioner of Patents. Washington, D. C."